United States Patent
Schultheis et al.

[11] Patent Number: 5,944,324
[45] Date of Patent: Aug. 31, 1999

[54] ARTICLE MADE OF BRITTLE MATERIAL ENCAPSULATED IN AN INJECTION-MOLDED PLASTIC HOLDING FRAME

[75] Inventors: Bernd Schultheis, Schwabenheim; Dietrich Busch, Newton Aycliffe; Thomas Heisner; Herwig Scheidler, both of Mainz, all of Germany

[73] Assignee: Glaswerke, Schott, Mainz, Germany

[21] Appl. No.: 08/835,969

[22] Filed: Apr. 11, 1997

[30] Foreign Application Priority Data

Apr. 19, 1996 [DE] Germany ............................ 196 15 371

[51] Int. Cl.⁶ ............................................. F16J 15/02
[52] U.S. Cl. ........................................... 277/637; 277/642
[58] Field of Search .................... 277/630, 637, 277/641, 642, 921

[56] References Cited

U.S. PATENT DOCUMENTS

| | | |
|---|---|---|
| 2,825,941 | 3/1958 | Lux et al. . |
| 3,061,895 | 11/1962 | Kleinhaus . |
| 3,263,014 | 7/1966 | Deisenroth ........................ 264/261 |
| 4,123,071 | 10/1978 | Yamamoto . |
| 4,249,517 | 2/1981 | Schroeder et al. . |
| 4,524,978 | 6/1985 | Mauser . |
| 4,690,412 | 9/1987 | Tuckley et al. . |
| 4,708,351 | 11/1987 | Midooka et al. . |
| 4,930,790 | 6/1990 | Sheridan . |
| 4,963,413 | 10/1990 | Amano . |
| 5,362,145 | 11/1994 | Bird et al. ........................ 312/408 |
| 5,489,104 | 2/1996 | Wolff . |
| 5,678,827 | 10/1997 | Burian et al. . |

FOREIGN PATENT DOCUMENTS

| | | | |
|---|---|---|---|
| 391122 A2 | 3/1990 | European Pat. Off. ........ F24C 15/10 |
| 2 393 663 | 1/1979 | France ........................... B29C 6/02 |
| 2 646 800 | 11/1990 | France ........................... B29C 45/14 |
| 26 00 933 | 7/1996 | France ........................... B29C 45/14 |
| 35 32 424 A1 | 4/1986 | Germany ...................... B29C 45/14 |
| 90 04 180 | 8/1991 | Germany ...................... F25D 25/02 |

OTHER PUBLICATIONS

Patent Abstracts of Japan, vol. 96, No. &, Jul. 31, 1996 & JP 08 072094 A (Asahi K.K.), Mar. 19, 1996, *Zusammengfssung*.

Patent Abstracts of Japan vol. 96, No.4, Apr. 30, 1996, & JP 07 323727 A (Hashimoto Forming Ind Co Ltd), Dec. 12, 1995, *Zusammenfassung*.

Handbook of Chemistry and Physics, Thirty–Third Edition, by Chemical Rubber Publishing Co., p. 1849.

Primary Examiner—Anthony Knight
Assistant Examiner—John L. Beres
Attorney, Agent, or Firm—Kilpatrick Stockton LLP

[57] ABSTRACT

Shaped articles made of brittle material having a low coefficient of thermal expansion, for example designed as glass or glass-ceramic plates, are typically encapsulated with a holding frame made of plastic, which is produced by directly encapsulating the edges of the shaped article with plastic by injection moulding. In order to avoid stress concentrations in the shaped article, which inevitably form as a consequence of the differences in thermal expansion and the material-dependent shrinkage behaviour, according to the invention shrinkage-absorbing elements are embedded between the holding frame and the shaped article, which elements additionally ensure a permanently elastic bearing of the shaped articles when used in practice and provide sufficient sealing during use.

13 Claims, 3 Drawing Sheets

ARTICLE MADE OF BRITTLE MATERIAL ENCAPSULATED IN AN INJECTION-MOLDED PLASTIC HOLDING FRAME

FIELD OF THE INVENTION

The invention relates to a shaped article made of brittle material, which is encapsulated in an injection-moulded holding frame made of plastic. Shaped articles of this kind have a certain areal expansion and can therefore be referred to as planar shaped articles.

Furthermore, the invention relates to a method for encapsulating such a shaped article made of brittle material with a holding frame made of plastic, in which the shaped article is inserted into an injection mould and is directly encapsulated with the plastic by injection moulding.

BACKGROUND

Planar shaped articles, in particular plates of brittle materials, preferably those having a low coefficient of thermal expansion, such as glass or glass-ceramic plates, are used in many industrial and domestic fields. Typical examples are insulating window panes, hot plates having a glass-ceramic plate and glass shelves in refrigeration appliances.

To facilitate handling of such planar shaped articles, in particular during mounting, and in order to avoid a risk of breakage emanating from the edge regions, the shaped articles are placed in a holding frame. However, these holding frames typically consist of materials which have a different coefficient of thermal expansion from the shaped-article material.

Typical values of the coefficient of thermal expansion are listed below.

| Shaped-article material | |
|---|---|
| Glass-ceramic, e.g. the material known under the trade name Ceran ® | $\alpha < 0.5 \cdot 10^{-6}$ 1/K |
| Soda-lime glass | $\alpha \sim 9 \cdot 10^{-6}$ 1/K |
| Borosilicate glass, e.g. the material known under the trade name Duran ® | $\alpha \sim 3.3 \cdot 10^{-6}$ 1/K |
| Frame materials | |
| Aluminium | $\alpha \sim 25 \cdot 10^{-6}$ 1/K |
| Steel | $\alpha \sim 12 \cdot 10^{-6}$ 1/K |
| Plastics (general) | $\alpha$ typically 80 ... 200 $\cdot 10^{-6}$ 1/K |
| Special plastic, e.g. the glass-fibre-reinforced polyester known under the trade name Nu-Stone from Industrial Dielectrics Inc. | $\alpha \sim 15 \cdot 10^{-6}$ 1/K |

This difference in the coefficients of thermal expansion is mechanically particularly noticeable precisely in applications in which the shaped article, in particular plate, which has been placed in a holding frame is subject to severe temperature fluctuations, e.g. in the case of a glass-ceramic cooking surface, and particular consideration has to be given to this difference in terms of design and production when encapsulating the plate in the frame. Further factors are that it is necessary, as a result of the different expansions, in particular in the case of glass-ceramic cooking surfaces, to ensure a permanently sealed connection between plate and frame throughout the service life and for the cooking surface to be mounted in a permanently elastic manner under mechanical impact loading.

It is known to fix plates made of glass, glass-ceramic or other brittle materials in frames made of plastic or metal by means of permanently elastic adhesives (e.g. silicone adhesives and the like). Examples are window frames or glass-ceramic cooking surfaces. The permanently elastic adhesive in this case compensates for the different thermal expansions while retaining the seal.

Furthermore, so-called dry-mounting methods are known, in which the glass or glass-ceramic plate is clamped between permanently elastic sealing layers. The permanently elastic intermediate layers are required, on the one hand, so that it is not possible for any direct contact, which would lead to the surface being damaged and thus to breakage, to occur between the brittle material and, for example, the metal frame under mechanical stressing. On the other hand, this intermediate layer compensates differences in planarity and differences in the thermal expansion. The latter is extremely important, particularly for glass-ceramic cooking surfaces, since the glass-ceramic exhibits virtually no expansion at high temperatures, but the frame, depending on the material, generally does expand at elevated temperatures. In addition, the elastic intermediate layer largely avoids stress being transmitted from the frame onto the brittle glass/glass-ceramic material.

It is known from DE-U-90 04 180.1 to design shelves of a domestic refrigerator as glass plates which are encapsulated by a closed plastic frame, the plastic frame being formed in a simple manner by encapsulating the glass plate by injection moulding. This encapsulation by injection moulding is carried out by means of known, simple injection moulding processes, in which plastics are injection-moulded directly around panes of glass. In this process, the pane of glass is placed in a mould, into which molten plastic is then injected at high pressure. The plastic, which flows in the plastic state, in this case fills the cavities of the mould and encloses the pane of glass in a sealing manner, provided that the frame engages over the pane of glass sufficiently. However, a problem with this process is that the plastic shrinks to a relatively large extent, and as a result relatively high curving stresses are induced in the pane of glass. Moreover, in practice, this application is hindered by differences in the thermal expansion. On the other hand, it is possible, for example by tempering the glass, to make the latter able to withstand substantially greater mechanical loads, so that it does not break when curving stresses occur. An application of this kind is described in U.S. Pat. No. 5,362,145, in which tempered soda-lime glass is encapsulated with a synthetic polypropylene material by injection moulding.

Such curving stresses are reinforced, primarily, by the frame design as well, if, for example during cooling, an additional force component arises in the direction perpendicular to the plane of the plate as a result of non-uniform shrinkage. Particularly in the case of thin plates, the tendency to curving is more pronounced than in the case of a relatively thick plate. Furthermore, this behaviour is adversely intensified if the sides of the glass plate have different surface structures (protrusions, printing, etc.), which additionally results in a different strength level. Therefore, even minute damage to the surface can lead to breakage.

Particularly when the brittle material glass-ceramic for the shaped article is combined, in the form of a plate, with plastics as the frame material, this may lead to problems in manufacture and over the service life, because of the lower mechanical strength of the plate compared to thermally tempered glass and because of the very different thermal expansions at severely fluctuating temperatures, such as for example in the case of a cooking surface. A mounting profile strip for glass-ceramic cooking hobs which has a flange section enclosing the glass-ceramic plate in the manner of a frame is known from EP-0,391,122 A2. This document also provides for injection-moulding the frame, which is formed from the mounting profile strip, as a single-piece component directly onto the edge of the glass-ceramic plate in one operation and without seams, so that it is in direct contact with the said glass-ceramic plate.

Due to the direct contact of the glass-ceramic plate with the injection-moulded plastic frame encapsulating it, for the reasons described above the brittle material is subjected to high mechanical loads during injection moulding, to say nothing of the problems during use.

SUMMARY OF THE INVENTION

The invention proceeds from the shaped article made of brittle material having a holding frame made of plastic described at the outset and from the method described at the outset, which makes it possible, fundamentally in a comparably simple manner, to encapsulate the shaped articles with a frame.

The object of the invention is to configure the shaped article with the injection-moulded plastic holding frame encapsulating it, and the method, such that brittle materials having, in particular, small coefficients of thermal expansion and comparatively low mechanical strength can be encapsulated by injection-moulding processes with plastics of higher thermal expansion and/or with a high volume shrinkage due to hardening, without encountering the abovementioned risks of breakage and problems in use.

In particular, it is thus also intended to provide, for glass-ceramic cooking surfaces, a method in which the cooking surface is encapsulated with plastics as the frame material by injection moulding. This also applies, without limitation, to other brittle materials having comparatively low mechanical strength.

This object is achieved, according to the invention, for the design of the shaped article, on the one hand in that at least one shrinkage-absorbing element is embedded between the holding frame and the shaped article which is to be encapsulated by injection moulding.

As an alternative, the object is solved for the design of the shaped article in that elements which structurally absorb shrinkage are moulded out in the holding frame.

Proceeding from the method described at the outset, the object is solved according to the invention on the one hand in that at least one shrinkage-absorbing element is inserted separately into the injection mould or is introduced into the injection mould together with the shaped article to be encapsulated by injection moulding, arranged on the said shaped article, prior to injection moulding, and alternatively in that the injection mould is designed such that regions which structurally absorb shrinkage can be moulded out in the holding frame during moulding.

Furthermore, the object is solved in that in a first injection moulding process step, a shrinkage-absorbing element is moulded onto the edge of the shaped article and then, in a second injection moulding process step, the holding frame is moulded out.

Due to the shrinkage occurring during hardening of the plastic of the holding frame, the shrinkage-absorbing elements are compressed. The mechanical stress which then acts on the plate made of brittle material is as a result minimized and does not reach a level which could entail a risk of the plate made of brittle material breaking or could adversely affect the sealing between the plate and the frame during its service life.

Moreover, when used in practice, the embedded elements ensure a permanently elastic bearing of the shaped articles, which is extremely advantageous for the mechanical impact resistance, and moreover they ensure sufficient sealing between the shaped article and the frame during use.

In accordance with a refinement of the invention, in the most simple case, it is sufficient to introduce the shrinkage-absorbing elements in the corner regions of the plastic holding frame, since the greatest force component, which leads in particular to a curving stress in the plate made of brittle material, acts in these corner regions.

In accordance with a further development of the invention, it is also possible to use encircling shrinkage-absorbing elements in the manner of a sealing profile, e.g. sealing rings, U- or L-profiles, or the like, made of corresponding compressible materials, if appropriate in addition to shrinkage-absorbing elements in the corner regions. This simplifies the production process and also ensures a uniform distribution of stresses.

Furthermore, particular edge geometries are envisaged for the glass or glass-ceramic plates, which geometries additionally largely prevent, on the one hand, mechanical stress concentrations and, on the other hand, cracks at the edge surface which may lead to breakage.

BRIEF DESCRIPTION OF THE DRAWINGS

Further refinements and advantages of the invention will emerge from the description of exemplary embodiments depicted in the drawings, in which.

DETAILED DESCRIPTION

Figure 1:
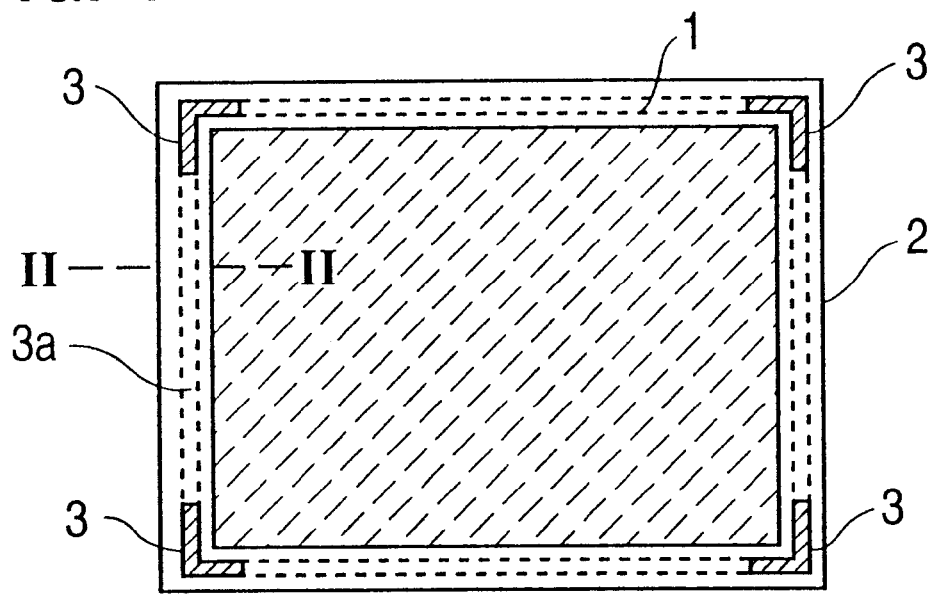
FIG. 1 shows, in plan view, a plate made of brittle material, encapsulated in a plastic frame having shrinkage-absorbing elements in accordance with the invention in a number of variants.

FIG. 1 shows diagrammatically, in plan view, a plate-like shaped article 1 made of brittle material having a low coefficient of thermal expansion, which shaped article is encapsulated in a plastic frame 2, preferably by direct injection moulding of the plastic.

The plate-like shaped article in accordance with FIG. 1 is a preferred exemplary embodiment of a planar shaped article. Shaped articles made of brittle material having a different form may also be used. The plate-like shaped article in accordance with FIG. 1 also does not have to be of continuously flat design. It may, for example, also be of bent or bevelled design.

The brittle material may, in particular, consist of glass, glass-ceramic, ceramic, or ceramic mat material. In the case of glass, the brittle material preferably consists of untempered glass, which is significantly less expensive than tempered glass. The glass which is used here preferably has a coefficient of thermal expansion of less than or equal to $4.5 \cdot 10^{-6} 1/K$. In the case of glass-ceramic being used as the brittle material, it preferably has a coefficient of expansion of less than or equal to $1.5 \cdot 10^{-6} 1/K$. The considerations below apply correspondingly to all these embodiments.

In order to avoid stress concentrations in the glass-ceramic plate 1, which inevitably result from the differences in thermal expansion and the material-dependant shrinkage behaviour, according to the invention shrinkage-absorbing elements 3 are embedded in the corner regions of the plate 1. These elements are compressed by the shrinkage of the plastic frame following hardening of the plastic. The mechanical stress on the glass-ceramic plate is as a result minimized.

In the simplest case, it is sufficient, as shown, to introduce the elements 3 into the corner region, since this is where the greatest force component acts, leading in particular to a curving stress of the glass-ceramic plate.

Also advantageous is the introduction of an encircling element 3a, for example a type of sealing ring. In the simplest case, elements of this kind comprise sealing profiles which can be compressed. Examples of these are sealing rings made of foamed rubber or also ceramic mat materials or sealing rings which in turn are compressible. Preferably, temperature-resistant materials are used which are able to withstand, at least for a short time, the processing temperatures typical in injection moulding of 200–350° C. and can be compressed (e.g. foamed silicone rubber or soft silicone). Materials of this kind are also used in the case of the corner elements 3.

The method for encapsulating the plate 1 with the holding frame 2 made of plastic is advantageously very simple. After the glass-ceramic plate 1 which is to be encapsulated by injection moulding has been inserted into an injection mould corresponding to the frame shape to be formed, a corresponding ring 3a is placed around the plate or in the mould in a groove, and/or the corner elements 3 are introduced. After closing the mould, the molten plastic is injected into the mould and surrounds the plate, including the ring 3a and/or the elements 3. After a certain holding time, the mould is opened. In this case, the plastic cools to a relatively high degree even during the holding time, the plastic shrinking onto the glass-ceramic plate 1 while forming the holding frame 2, in which process the shrinkage elements 3, 3a are compressed. As an alternative, it may be advantageous for the plate 2 to be provided with a corresponding ring 3a and/or the elements 3 even prior to the injection moulding process and for it to be introduced into the mould in this form. In this case, self-adhesive silicone profiles are advantageous. These simultaneously provide a certain degree of protection against damage to the shaped article during handling when inserting into the injection mould.

Injection moulding per se is a process known from the prior art and therefore does not need to be explained in detail here.

Figure 2:
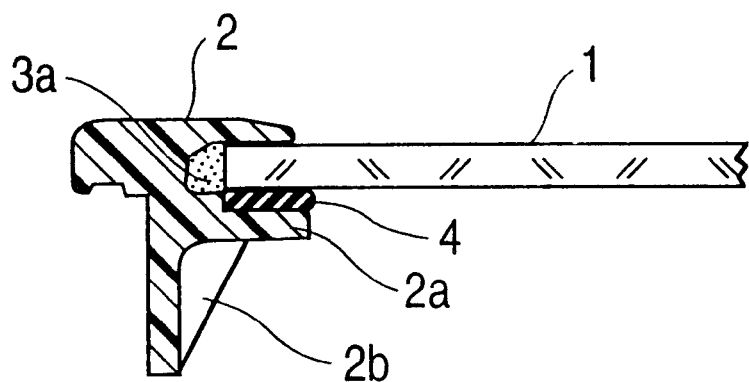
FIG. 2 shows a section through a part of the frame of FIG. 1, on the line II—II, having an additional refinement.

FIG. 2 shows the arrangement of FIG. 1 in section on the line II—II. The glass-ceramic plate 1 in this case bears additionally on a permanently elastic sealing support 4, for example made from silicone profile, which in turn is held by a bearing limb 2a of the holding frame 2, optionally additionally supported by transverse struts 2b.

Figure 3:
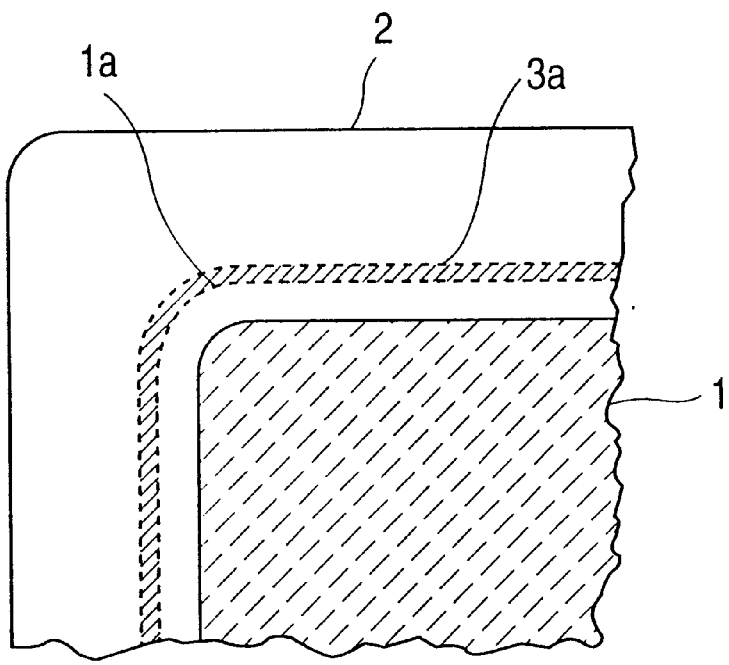
FIG. 3 shows an enlarged portion of the top view in accordance with FIG. 1, in the corner region of the plate.

FIG. 3 shows an enlarged portion of FIG. 1. In this example, an encircling sealing ring 3a was placed around the glass-ceramic plate 1 prior to the injection moulding process. The glass-ceramic plate additionally has, in the corner region, an arrangement 1a which is intended to distribute the stresses forming there. A corresponding chamfer of the corners is likewise conceivable.

Figure 6:
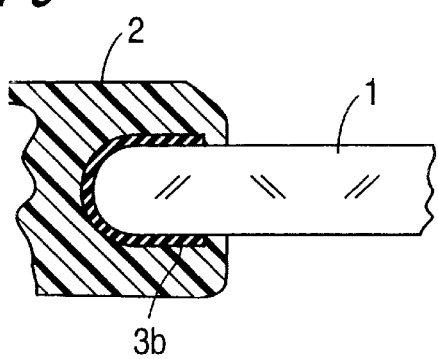
FIG. 6 shows diagrammatically, in section, a portion of the holding frame with plate, in which the edges of the plate are surrounded by a foamed U-profile as the shrinkage-absorbing element.

A further exemplary embodiment of an encircling shrinkage-absorbing element is shown in FIG. 6. In this case, the glass-ceramic pane 1 to be encapsulated by injection moulding is surrounded in the edge region by a U-profile 3b, which may also be of self-adhesive design, and is then inserted into the injection mould.

Figure 7:
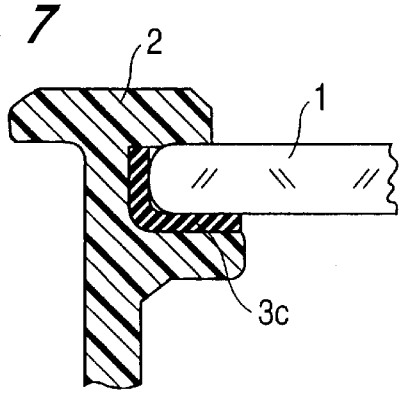
FIG. 7 shows diagrammatically, in section, a portion of the holding frame with plate, in which the plate edges have been surrounded by an encircling L-shaped, permanently elastic profile prior to the injection moulding process.

A further exemplary embodiment is shown in FIG. 7. In this case, the glass-ceramic plate 1 is firstly surrounded by a self-adhesive L-profile 3c in the edge region and is then inserted into the injection mould.

Figure 4:
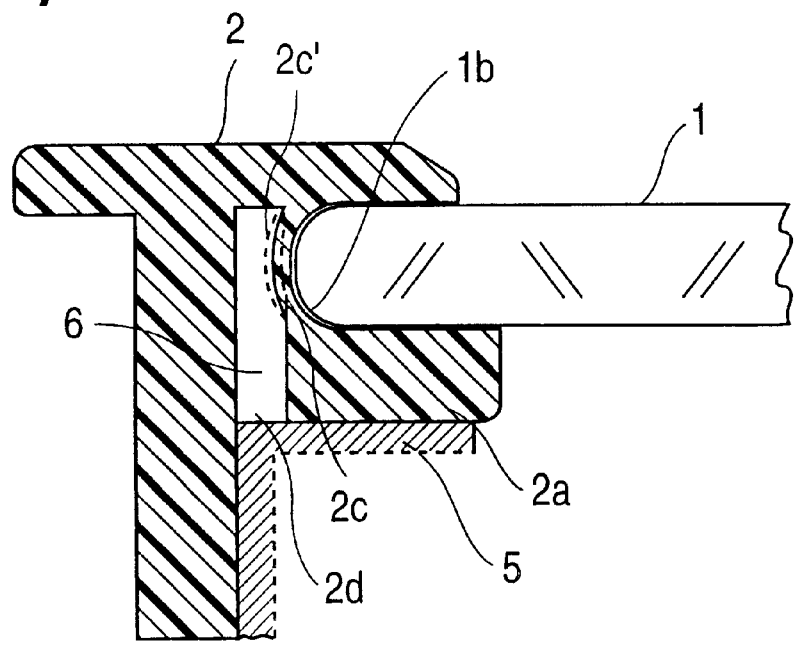
FIGS. 4 and 5 show diagrammatically, in section and in plan view, a frame design in which elements which structurally absorb shrinkage are molded out in the holding frame.
Figure 5:
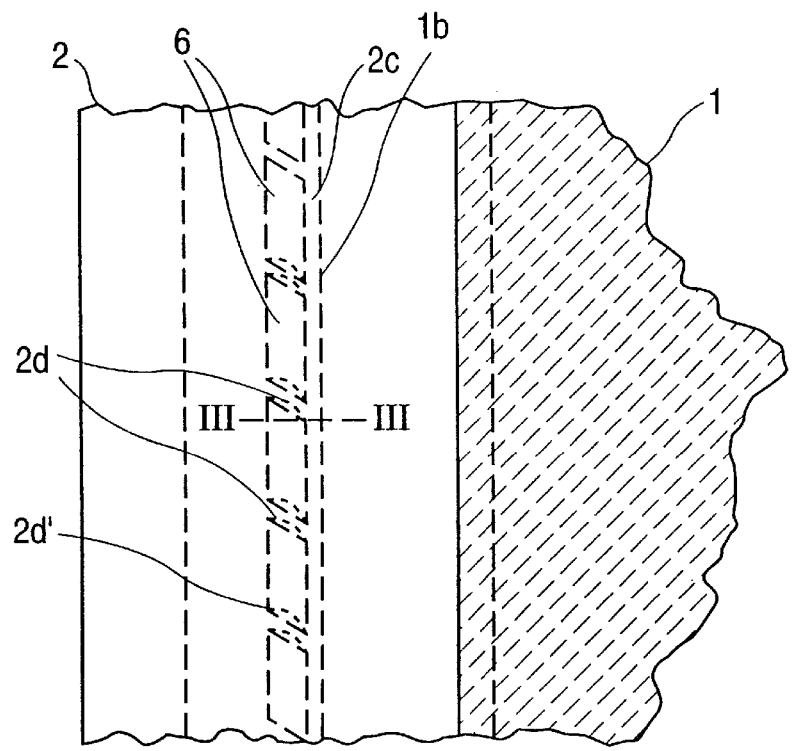

FIGS. 4 and 5 show diagrammatically, in section and in plan view, a frame design in which elements which structurally absorb shrinkage are incorporated into the holding frame 2, as a further exemplary embodiment. In this case, the frame profile is shaped out by a corresponding injection mould in such a manner that cavities 6 are provided between the solid, bearing part of the frame 2 and the glass-ceramic plate 1, which cavities absorb the shrinkage. The glass-ceramic plate 1 is in this case held in the end region only by thin, easily resilient webs 2c, which in turn are held by means of thin transverse webs 2d, which are preferably positioned obliquely. In this design, shrinkage stresses occurring are degraded by means of a defined deformation of the webs 2c and/or 2d. In order additionally to improve the stability of the frame design, if appropriate a pre-assembled reinforcement bracket 5, made of metal or plastic, may additionally be arranged.

A further supportive measure which is possible for all the embodiments in order to avoid the risk of breakage is a special machining of the edges of the glass or glass-ceramic plate, in which damages to the edges, such as microcracks and/or conchoidal fractures, are avoided. Special grinding and polishing methods are suitable. In particular, the C-facet-cutting which is already known in the case of cooking surfaces, in accordance with FIG. 5, location 1b, is distinguished by a corresponding smooth, almost polished surface.

The plastic material for the holding frame is determined in accordance with the intended application of the plate which is encapsulated by injection moulding. For frames of glass-ceramic plates for cooking surfaces, heat-stable, optionally partially fibre-reinforced, for example by glass fibres, low-torsion special plastics are required, which, on the other hand, transmit mechanical stress onto the glass-ceramic plate to a particularly high extent, due to their toughness.

Further properties which may be mentioned for plastics of this kind which are to be used as cooking-surface frames are:
- chemically resistant and stain-resistant to various customary domestic cleaners and food-stuffs
- scratch-resistant
- colour-fast
- compatible with foodstuffs.

The plastics which have been used hitherto to encapsulate tempered panes of glass by injection moulding, e.g.

polypropylene, tend to be distinguished by greater flowability, so that although higher shrinkage stresses occur for a short time initially, these can be degraded relatively quickly. In addition, the processing temperature for these plastics is also lower, due to the low melting point, than for the plastics required for cooking-surface frames. These plastics are therefore preferably suitable for applications involving using less demanding requirements than in the case of cooking-surface frames.

Depending on the intended application, the frames may have various profiles (e.g. U-profile, L-profile). They are preferably already provided with appropriate openings, bulges and holding devices for mounting further cooking hob elements, for example heating elements or further frame parts, which are very useful for further assembly (e.g. snap-in connections, latching openings, etc.).

The brittle materials which can preferably be used in the context of the invention are untempered special glasses having an $\alpha \leq 4.5 \cdot 10^{-6} 1/K$ in particular glass ceramics having an $\alpha \leq 1.5 \cdot 10^{-6} 1/K$.

Examples which may be mentioned are: the material known under the trade name Ceran®, the white glass-ceramic material Neoceram® from NEG and borosilicate glass (Borofloat® from Schott).

In addition to the applications which have already been mentioned, the plates according to the invention are suitable for grill appliances, induction cooking appliances and as microwave doors and as cover plates for chest freezers, doors for refrigerators or freezer cabinets and for cooker hoods.

We claim:

1. An article for a cooking surface, comprising:
   a brittle material selected from the group consisting of untempered glass having a coefficient of thermal expansion of less than or equal to $4.5 \times 10^{-6}/K$, glass ceramic having a coefficient of thermal expansion of less than or equal $1.5 \times 10^{-6}/K$, and ceramic;
   a molded clamping frame comprising a synthetic material surrounding the brittle material, the molded clamping frame being closely shrunk onto the brittle material; and
   at least one shrink absorbing element embedded between the clamping frame and the brittle material.

2. The article of claim 1, wherein the molded clamping frame includes a plurality of corner areas, and wherein the at least one shrink absorbing element is embedded in all of the corner areas of the clamping frame between the clamping frame and the cavity.

3. The article of claim 1, wherein the brittle material has a circumference, and wherein the at least one shrink absorbing element is embedded around the circumference of the brittle material between the clamping frame and the brittle material.

4. The article of claim 1, wherein the shrink absorbing element comprises a compressible material.

5. The article of claim 4, wherein the compressible material comprises a toroidal sealer.

6. The article of claim 1, wherein the shrink absorbing element comprises a temperature resistant material.

7. The article of claim 6, wherein the temperature resistant material comprises one from the group of silicone rubber, silicone cellular rubber, cellular rubber, and a ceramic mat material.

8. The article of claim 3, wherein the brittle material has an edge, and wherein the circumferential shrink absorbing element has a U-shaped profile that encompasses the edge of the brittle material.

9. The article of claim 3, wherein the brittle material has an edge, and wherein the circumferential shrink absorbing element has a L-shaped profile that encompasses the edge of the brittle material.

10. The article of claim 4, wherein the brittle material has an edge, and wherein the at least one shrink absorbing element is pressably attached to the edge of the brittle material.

11. An article, comprising:
    a brittle material selected from the group comprised of untempered glass, glass ceramic, and ceramic, wherein the glass ceramic has a coefficient of thermal expansion of less than or equal $1.5 \times 10^{-6}/K$;
    a molded clamping frame comprising a synthetic material, the molded clamping frame surrounding the brittle material and closely shrunk onto the brittle material; and
    at least one shrink absorbing element structurally formed into the molded clamping frame.

12. An article, comprising:
    a brittle material selected from the group comprised of untempered glass, glass ceramic, and ceramic, wherein the glass is an untempered special glass having a coefficient of thermal expansion of less than or equal to $4.5 \times 10^{-6}/K$;
    a molded clamping frame comprising a synthetic material, the molded clamping frame surrounding the brittle material and closely shrunk onto the brittle material; and
    at least one shrink absorbing element structurally formed into the molded clamping frame.

13. An article, comprising:
    a brittle material selected from the group comprised of untempered glass, glass ceramic, and ceramic, wherein the ceramic is for cooking surfaces;
    a molded clamping frame comprising a synthetic material, the molded clamping frame surrounding the brittle material and closely shrunk onto the brittle material; and
    at least one shrink absorbing element structurally formed into the molded clamping frame.

* * * * *